United States Patent Office 3,516,530
Patented June 23, 1970

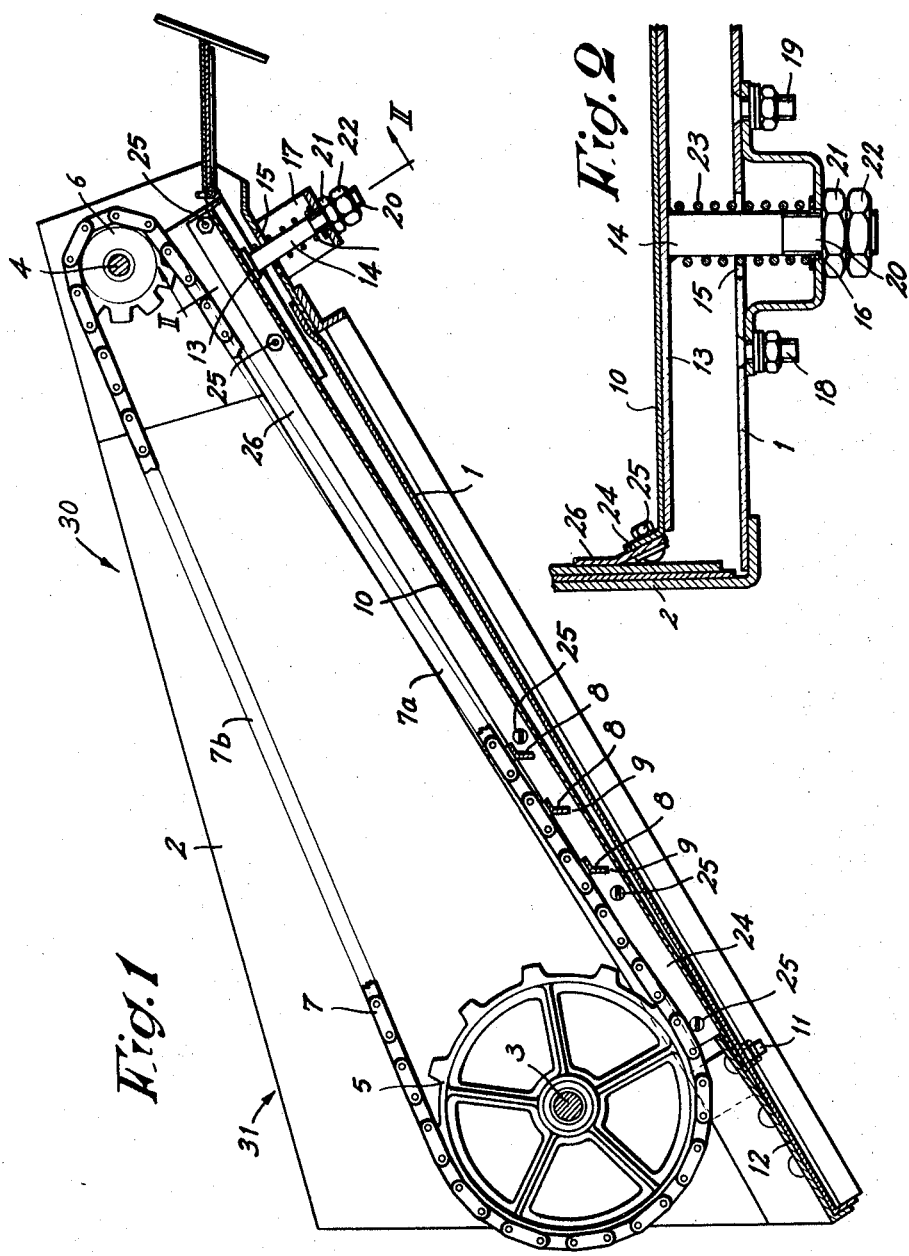

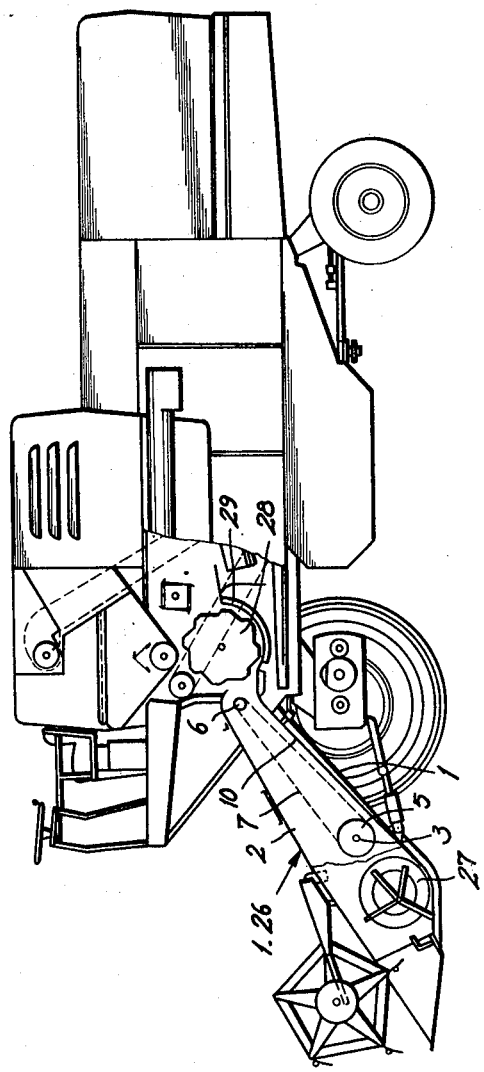

3,516,530
ELEVATORS FOR CROPS ETC.
August Braet, Beernem, Belgium, assignor to Clayson
N.V., Zedelgen, Belgium, a company of Belgium
Filed Dec. 18, 1967, Ser. No. 691,415
Claims priority, application Belgium, Dec. 19, 1966,
46,341, Patent 691,385
Int. Cl. B65g 65/06; A01d 23/06
U.S. Cl. 198—8                                9 Claims

ABSTRACT OF THE DISCLOSURE

Improved elevators for crops and similar materials comprising a fixed bottom plate, a conveyor means movable above said bottom plate and a false bottom plate hinged to said bottom plate at one end thereof and elastically urged towards said conveyor means at the other end.

---

The present invention pertains to improvements on elevators normally used to transport crops etc.

More specifically, the present invention relates to elevators of the type comprising a conveyor device located above a fixed bottom plate, said device being for instance constituted by a pair of endless parallel chains mutually connected by the actual conveying elements.

The latter can for instance be formed by flat or angle bars, etc., toothed or not and which are mounted at regular distances onto the above mentioned chains.

Such a type of elevator is often used to take crops to a device for further processing of these crops.

It is known that the optimum working of the device fed by such an elevator can only be obtained when crop is fed to said device at a constant rate.

In present constructions the shaft of the front or lower sprockets is spring loaded to avoid choking up of the crop between the above mentioned chains, respectively transport parts and the bottom plate of the elevator, when crop is irregularly supplied to the above mentioned elevator in such a way that when great quantities of crop are supplied, said shaft can give way vertically. The bottom plate of the elevator is further mounted in such a way that the distance between this bottom plate and the conveyor moving above it, progressively increases towards the discharge end of said elevator.

An important disadvantage of such a known construction is that much crop is left on said bottom plate out of reach of said conveying elements mounted on said chains, to pile up until it is taken away in batches, that is to say very irregularly, to the succeeding processing device.

A typical example of the use of such an elevator is to be found on combines, where the optimum working of the threshing mechanism can only be obtained when the mowed crop is carried at an equal rate from the header to the threshing equipment.

The main object of the present invention is to eliminate the above mentioned and other disadvantages of such known elevators with fixed bottom plate.

To this purpose the improvements on elevators for crops etc. of the type mainly consisting of a bottom plate with conveying elements moving above it, substantially reside in the fact that the above mentioned bottom plate may move with respect to the conveying device located there above, the motion of said bottom plate being controlled and checked by the crop itself, which has to be transported by said elevator.

According to a preferred embodiment such a bottom plate is hingedly fixed at the infeed side of the elevator, as the distance between the conveying elements and the bottom plate is here automatically adjusted due to the spring loaded adjustment of the above mentioned lower shaft while said bottom plate is pushed upwards at the discharge end of such an elevator by means of springs, the pressure of which being suitably chosen in function of eventual jammings which could occur between said bottom plate and the conveying elements located thereabove. In this manner, the movable bottom plate is always urged towards the conveying elements so that jamming of crop may never occur.

To better show the characteristics of the present invention, one preferred embodiment thereof is hereafter described by way of example only and without any limiting character. This description refers to the enclosed drawings, in which:

FIG. 1 shows a longitudinal section of the improved elevator according to the present invention;

FIG. 2 is a fragmentary cross section according to line II—II of FIG. 1;

FIG. 3 is a schematic side view, partly in section, of a combine equipped with an elevator according to FIGS. 1 and 2.

As shown in the FIGS. 1 and 2, the elevator according to the present invention, comprises a chain conveyor 30 and support means or casing 31. The support means or casing has a bottom plate 1 provided with sidewalls 2 between which shafts are mounted, respectively 3 and 4, on each of which pairs of sprockets, respectively 5 and 6, are mounted. The sprockets 5 are each connected with a sprocket 6 by means of a suitable chain 7 and, in this case, the chains 7 are mutually connected at regular distances by angle bars 8, the lower part 9 of which being toothed to efficiently act on the crop to be transported. The chain conveyor has a crop moving portion 7a and a return portion 7b.

The shaft 3 of sprockets 5 is spring loaded in a known way, so that the actual conveying device 3 to 9 can hinge upwards around shaft 4 when a great quantity of crop is supplied.

According to the invention, a false bottom plate 10 is mounted above said bottom plate 1 and fixed to the latter, near the infeed end of the so formed elevator, by means of one or more bolts 11. The lower end of the bottom plate 10 is covered by a plate 12 which prevents crop from getting caught between bottom 1 and false bottom 10.

Near the discharge end of the elevator and under the bottom plate 10, a cross support 13 is provided on which at least one rod 14 is fixed.

The latter passes successively through a hole 15 provided in the above mentioned bottom plate 1 and through a hole 16 provided in a stirrup or U-shaped support 17 which is fixed underneath the above mentioned bottom plate 1 by means of screws, respectively 18 and 19. The free end of the above mentioned rod 14 is provided with a threaded part 20 co-operating with nuts, respectively 21 and 22.

A spiral spring 23 is mounted between the above mentioned bottom plate 10, respectively the above mentioned support 13, and the stirrup or U-shaped support 17.

The above mentioned false bottom 10 is provided, near said sidewalls 2, with upwardly slanted parts 24 which are connected, by means of bolts 25, with strips 26 made in relatively elastic material, said strips 26 forming a sealing between the false bottom 10 and the sidewalls 2, on both sides of the elevator.

The operation of the elevator as shown in FIGS. 1 and 2 is very simple and as follows: By tensioning, respectively untensioning, the nuts 21 and 22, the minimum distance between the above mentioned false bottom 10 and, in this case, the toothed angle bars 8 can be set. This distance can be adjusted in such a way that the transported crop is always pushed against the above mentioned angle bars, so that this crop is transported without slowing down, to a further processing equipment.

In one alternate embodiment, to the above mentioned bottom 1 may be substituted an open frame construction provided with means for elastically supporting said movable false bottom 10, so that in this particular case the false bottom 10 constitutes in fact the real bottom plate of the elevator. In this way dust etc. is prevented to heap up between bottoms 1 and 10, which would otherwise hinder the spring loaded working of false bottom 10.

In FIG. 3 a combine is shown, by way of example, which incorporates an elevator according to the present invention.

In this case, the mowed crop is fed by a so-called feeding auger 27 to the inlet of elevator 1-26, where it is carried away by the above mentioned toothed angle bars 8 and transported to the threshing equipment, schematically represented by the threshing drum 28 and the cooperating concave 29.

In this case, as already described with reference to FIGS. 1 and 2, the crop is grasped by the toothed angle bars 8 and transported between these bars and the above mentioned false bottom 10, said crop being constantly urged against the angle bars 8 by the bottom 10 so that the risk of jamming up is almost completely excluded, so that the above mentioned threshing mechanism 28-29 is fed at a more constant rate, with the result that the maximum output of such a combine can more easily be reached.

What I claim is:

1. In combination with a crop elevator having a longitudinally and transversely extending chain conveyor and longitudinally spaced infeed and discharge sprocket means for carrying the chain conveyor at opposite ends and forming a crop moving portion and a return portion, support means, a bottom plate facing said crop moving portion for cooperating with said crop moving portion to convey crops and being hingedly fixed to said support means adjacent said infeed sprocket means and having spring-like means between said support means and said bottom plate adjacent said discharge sprocket means to urge said bottom plate towards said crop conveying portion to vary the spaced relation between said bottom plate and said crop moving portion in response to the amount of crop being conveyed.

2. In combination with a crop elevator as set forth in claim 1 wherein adjustable stop means are provided between said bottom plate and said support means to limit movement of said bottom plate towards said crop conveying portion.

3. In combination with a crop elevator as set forth in claim 1 wherein said spring-like means is mounted between said movable plate and said support means on the opposite side of said movable plate from said crop conveying portion.

4. In combination with a crop elevator as set forth in claim 1 wherein said spring-like means is a spiral spring and a rod is provided mounted on said bottom plate and adjustably engaging said support means on the opposite side from said crop conveying portion to limit the spacing of said bottom plate from said crop conveying portion.

5. In combination with a crop elevator as set forth in claim 1 wherein said infeed sprocket means is movably supported on said support means and means are provided for constantly urging said infeed sprocket means towards said bottom plate.

6. In combination with a crop elevator as set forth in claim 1 wherein said spring-like means is a spiral spring and said support means is positioned on the opposite side of said bottom plate from said chain conveyor with said spiral spring positioned therebetween for urging said bottom plate towards said chain conveyor and a rod is provided attached to said bottom plate and extending through said spiral spring and having a threaded portion with a nut for adjustably coupling with said support means and to set a minimum distance between said movable bottom plate and said chain conveyor.

7. In combination with a crop elevator as set forth in claim 6 wherein said support means has side walls on opposite sides of said conveyor and elastic seals are provided on both sides of said movable plate in sealing relation with said sides and said movable plate.

8. In combination with a crop elevator as set forth in claim 1 wherein said support means has a fixed bottom plate below said movable bottom plate.

9. A crop conveying elevator comprising a support frame having a fixed bottom plate and two opposite side walls, a longitudinally and transversely extending conveyor having longitudinally spaced infeed and discharge sprockets rotatably mounted in said side walls and a crop conveying chain on said sprockets, said frame having a movable bottom above said fixed bottom plate hingedly affixed to said fixed bottom plate adjacent said infeed sprocket, spring means between said movable bottom plate and said fixed bottom plate urging said movable bottom plate towards said conveyor for varying the spacing depending on the passage of crops and rod means extending through said spring means and adjustably attached to said support frame to set the minimum distance between said movable bottom plate and said crop conveying chain under the pressure of said spring means.

References Cited
UNITED STATES PATENTS

| | | | |
|---|---|---|---|
| 3,096,605 | 7/1963 | Claas | 56—23 |
| 2,488,671 | 11/1949 | Lehman | 198—207 |
| 2,165,068 | 7/1939 | Protzeller | 198—174 |
| 2,513,430 | 7/1950 | Scheid | 198—8 |
| 2,935,834 | 5/1960 | Vaughn | 198—8 |

EVON C. BLUNK, Primary Examiner

R. S. GAITHER, Assistant Examiner

U.S. Cl. X.R.

56—23